United States Patent
Kim et al.

(10) Patent No.: US 7,925,237 B2
(45) Date of Patent: Apr. 12, 2011

(54) NOISE SUPPRESSION CIRCUIT FOR MOBILE PHONE

(75) Inventors: Sang Soon Kim, Suwon-si (KR); Ji Hyuk Cho, Uiwang-si (KR)

(73) Assignee: Samsung Electronics Co., Ltd (KR)

( * ) Notice: Subject to any disclaimer, the term of this patent is extended or adjusted under 35 U.S.C. 154(b) by 801 days.

(21) Appl. No.: 11/839,281

(22) Filed: Aug. 15, 2007

(65) Prior Publication Data
US 2008/0051157 A1    Feb. 28, 2008

(30) Foreign Application Priority Data

Aug. 24, 2006 (KR) .................. 10-2006-0080420

(51) Int. Cl.
*H04B 15/00* (2006.01)
*H04B 1/10* (2006.01)
*G10L 21/02* (2006.01)

(52) U.S. Cl. ....... 455/296; 455/570; 455/310; 455/63.1; 704/226

(58) Field of Classification Search .................. None
See application file for complete search history.

(56) References Cited

U.S. PATENT DOCUMENTS

| 6,144,937 | A  | * | 11/2000 | Ali ................................. 704/233 |
| 2004/0196984 | A1 | * | 10/2004 | Dame et al. ................... 381/71.1 |
| 2005/0195991 | A1 | * | 9/2005 | Wang et al. ................... 381/94.5 |
| 2006/0100868 | A1 | * | 5/2006 | Hetherington et al. ....... 704/226 |
| 2006/0178119 | A1 | * | 8/2006 | Jarvinen ...................... 455/114.2 |
| 2006/0255874 | A1 | * | 11/2006 | Okazaki et al. ............... 332/103 |
| 2006/0285700 | A1 | * | 12/2006 | Felder et al. ................. 381/94.5 |
| 2008/0095383 | A1 | * | 4/2008 | Pan et al. ..................... 381/71.11 |
| 2009/0010457 | A1 | * | 1/2009 | Munenaga et al. ........... 381/120 |

FOREIGN PATENT DOCUMENTS

JP    01-176104    *    7/1989

* cited by examiner

*Primary Examiner* — Matthew D. Anderson
*Assistant Examiner* — Gennadiy Tsvey
(74) *Attorney, Agent, or Firm* — The Farrell Law Firm, P.C.

(57) ABSTRACT

A noise suppression circuit and method for a mobile phone is disclosed that includes a codec for decoding a received audio signal; a speaker for reproducing the audio signal; and a low-pass filter, which includes: a resistor; and a varactor and a capacitor connected in parallel to ground. Characteristics of the low-pass filter are adjusted according to usage conditions, thereby effectively suppressing a white noise and popup noise during an ongoing call.

11 Claims, 3 Drawing Sheets

NOISE SUPPRESSION CIRCUIT FOR MOBILE PHONE

PRIORITY

This application claims priority to an application entitled "Noise Suppression Circuit For Mobile Phone" filed in the Korean Intellectual Property Office on Aug. 24, 2006 and assigned Ser. No. 2006-0080420, the contents of which are incorporated herein by reference.

BACKGROUND OF THE INVENTION

1. Field of the Invention

The present invention relates generally to a mobile phone and, more particularly, to a noise suppression circuit for a mobile phone.

2. Description of the Related Art

In a mobile phone, a noise suppression circuit is used on an audio line to reduce white noise that commonly exists during an ongoing call.

FIG. 1 illustrates a conventional noise suppression circuit for a mobile phone. Referring to FIG. 1, a Radio Frequency (RF) signal received by an antenna is passed through an RF unit 103 and then fed to a vocoder 105. The vocoder 105 extracts a digital audio data from the RF signal, and feeds the extracted digital audio data to a coder/decoder (codec) 107. The codec 107 converts the digital audio data into an analog audio signal and feeds the analog audio signal to a noise reduction filter 109, at which high frequency components of the analog audio signal are attenuated. The analog audio signal filtered through the noise reduction filter 109 is output through a speaker. The noise reduction filter 109 is a low-pass filter including a resistor and a capacitor.

In such a conventional noise suppression circuit, sound gain is increased or decreased depending upon presence or absence of an audio signal in order to reduce the white noise. However, the capacitance of the capacitor of the low-pass filter does not vary, regardless of the presence or absence of an audio signal. However, a high-capacitance capacitor provides good noise suppression but severe sound distortion, and a low-capacitance capacitor provides poor noise suppression.

Further, in the conventional noise suppression circuit, sound volume is reduced for noise suppression when an audio signal is absent, and sound volume is increased to a normal level when an audio signal is present. Thereby a software-processing burden of sound gain control is increased. Although reduction of sound gain is effective in suppression of noise in an initial audio signal, it may be ineffective in suppression of noise generating from the codec and subsequent devices, and of white noise, including popup noise.

SUMMARY OF THE INVENTION

The present invention has been made in view of the above problems, and an object of the present invention is to provide a noise suppression circuit for a mobile phone, wherein a variable-capacitance capacitor is used to optimize characteristics of a low-pass filter according to usage conditions, thereby enabling effective suppression of both a white noise and unavoidable noise.

In order to achieve the object, the present invention provides a noise suppression circuit for a mobile phone, including a coder/decoder (codec) for decoding a received audio signal; a speaker for reproducing the audio signal; and a low-pass filter including a variable capacitor, for reducing noise in the audio signal by adjusting the variable capacitor according to volume of the audio signal.

Preferably, the audio signal is a signal received by an antenna or an internally generated acoustic signal indicating operation states of the mobile phone.

The low-pass filter may include a resistor with a varactor and a capacitor connected in parallel to ground. Preferably, the capacitance of the variable capacitor, i.e. varactor, is increased when no voice signal is present in the audio signal. Preferably, when the audio signal is an internally generated acoustic signal, the capacitance of the varactor is increased immediately before turning-on the codec and is decreased immediately before reproduction of the audio signal.

Alternatively, the low-pass filter preferably includes a resistor; and a first capacitor and a second capacitor connected in parallel, wherein the first capacitor is grounded and the second capacitor is grounded via a switch. It is also preferable that, the switch is open when a voice signal is present in the audio signal, and is closed when a voice signal is not present in the audio signal. It is also preferable that, when the audio signal is an internally generated acoustic signal, the switch is closed immediately before turning-on the codec and is opened immediately before reproduction of the audio signal.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF THE PREFERRED EMBODIMENTS

Figure 1:
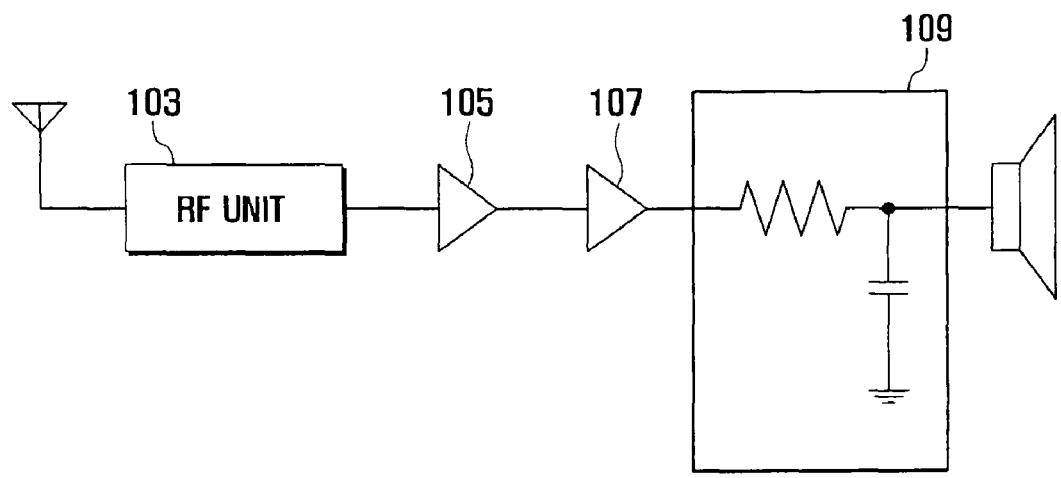
FIG. 1 illustrates a conventional noise suppression circuit for a mobile phone.

Hereinafter, preferred embodiments of the present invention are described in detail with reference to the accompanying drawings. The same reference symbols identify the same or corresponding elements in the drawings. Some constructions or processes known in the art may be not described to avoid obscuring the invention in unnecessary detail.

Figure 2:
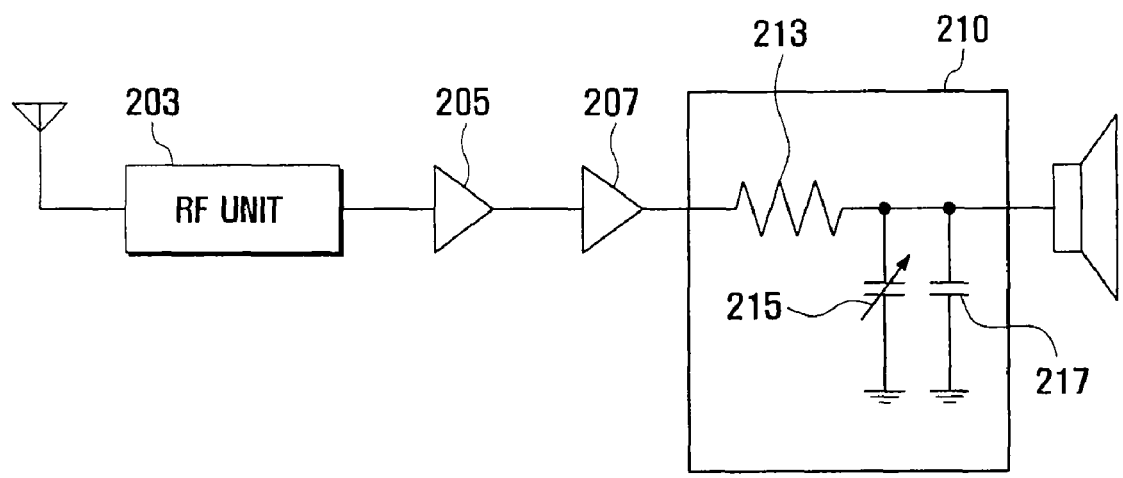
FIG. 2 illustrates a noise suppression circuit for a mobile phone according to a the present invention.

FIG. 2 illustrates a noise suppression circuit for a mobile phone according to the present invention. Referring to FIG. 2, the noise suppression circuit includes an RF unit 203 for processing an RF signal received by an antenna, a vocoder 205 for extracting digital audio data from the RF signal processed by the RF unit 203, a codec 207 for converting the extracted digital audio data into an analog audio signal, and a low-pass filter 210 for filtering out high frequency components of the analog audio signal from the codec 207 and outputting the filtered analog audio signal to a speaker. An audio signal includes a voice signal and an acoustic signal.

During a call using a mobile phone, when a voice signal is absent, a background noise in an audio signal is perceived as being loud; and when a voice signal is present, the background noise is mitigated by the voice signal. To avoid this, a noise suppression effect of the low-pass filter 210 is raised when a voice signal is absent, and is lowered so as not to aggravate signal distortion when a voice signal is present.

The low-pass filter 210 includes a resistor 213 connected to a capacitor 217 and a varactor 215 connected in parallel to ground. The varactor 215 acts as a variable capacitor, and the capacitance thereof may be controlled by a controller (not shown). Hence, the noise suppression effect of the low-pass filter 210 can be controlled by adjusting the capacitance of the varactor 215.

When a voice signal is present, the capacitance of the varactor 215 is lowered so as to reduce distortion of the voice signal; and when a voice signal is absent, the noise suppression effect is raised by increasing the capacitance of the varactor 215.

Figure 3:
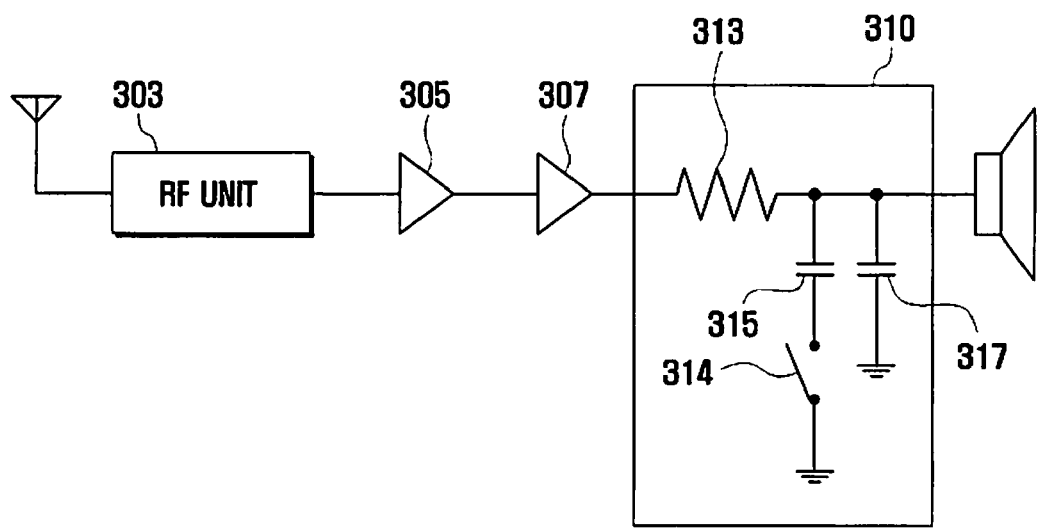
FIG. 3 illustrates a noise suppression circuit for a mobile phone according to another embodiment of the present invention.

FIG. 3 illustrates a noise suppression circuit for a mobile phone according to another embodiment of the present invention. Referring to FIG. 3, the noise suppression circuit includes an RF unit 303 for processing an RF signal received by an antenna, a vocoder 305 for extracting digital audio data from the RF signal processed by the RF unit 303, a codec 307 for converting the extracted digital audio data into an analog audio signal, and a low-pass filter 310 for filtering out high frequency components of the analog audio signal from the codec 307 and outputting the filtered analog audio signal to a speaker.

The low-pass filter 310 includes a resistor 313 connected to a first capacitor 317 and a second capacitor 315 connected in parallel, wherein the first capacitor 317 is grounded and the second capacitor 315 is grounded via a switch 314.

The noise suppression effect of the low-pass filter 310 can be controlled through adjustment of the capacitance of the low-pass filter 310 by turning on and off the switch 314 depending upon absence and presence of a voice signal.

When a voice signal is present, the capacitance of the low-pass filter 310 is lowered by turning off the switch 314 so as to reduce distortion of the voice signal; and when a voice signal is absent, the noise suppression effect is raised through increasing the capacitance of the low-pass filter 310 by turning on the switch 314.

Figure 4:
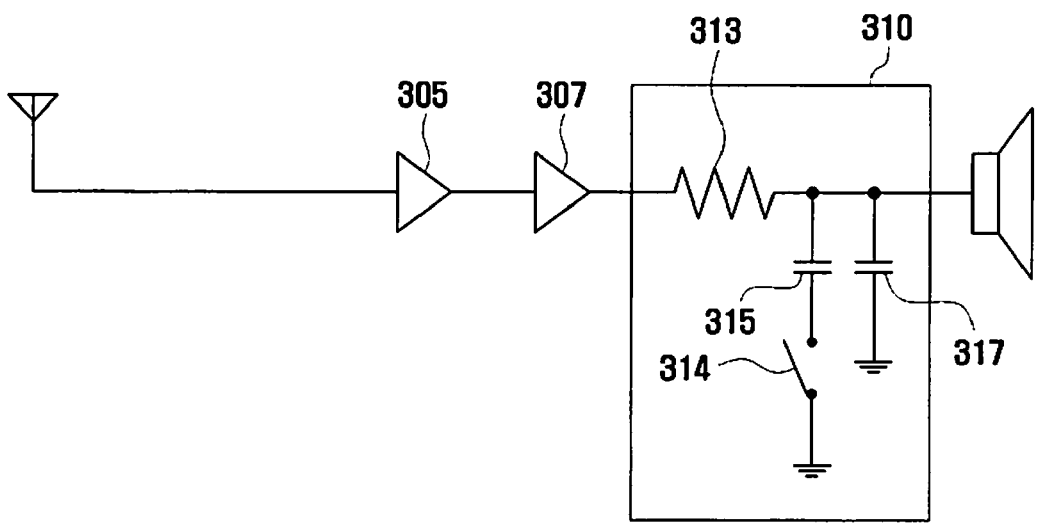
FIG. 4 illustrates a noise suppression circuit for a mobile phone according to another embodiment of the present invention.

FIG. 4 illustrates a noise suppression circuit for a mobile phone according to another embodiment of the present invention. The noise suppression circuit of FIG. 4 is identical to that of FIG. 3 except that a Main Control Unit (MCU) 403 is provided in the mobile phone instead of the RF unit 303 and the antenna is connected to an input terminal of the vocoder 305.

The noise suppression circuit of FIG. 4 aims to remove a popup noise, which is generated when an acoustic signal generated within the mobile phone is output. In general, for generation of key tones in the mobile phone under the control of the MCU 403, when the codec 307 is turned on for activation, a popup noise is generated at the turning-on time.

Figure 5A:
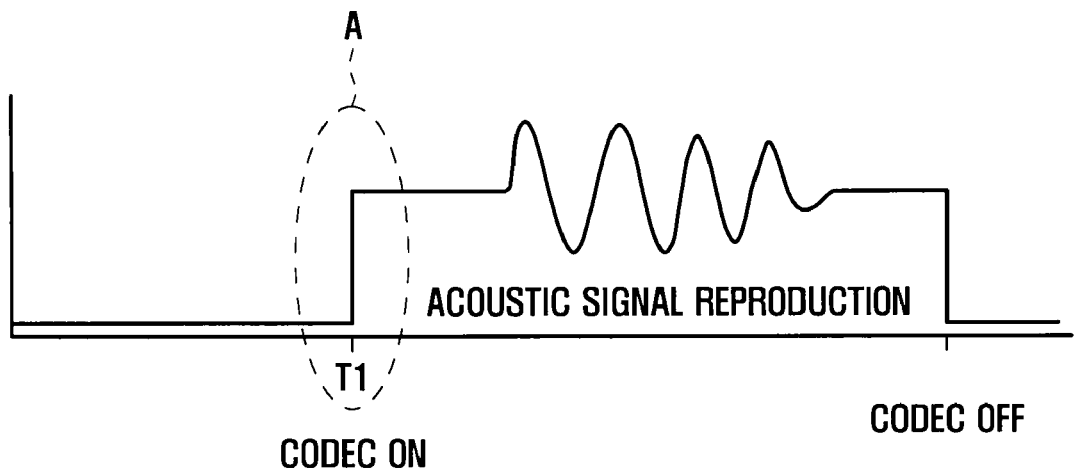
FIG. 5A illustrates generation of a popup noise during output of an acoustic signal generated in a mobile phone.
Figure 5B:
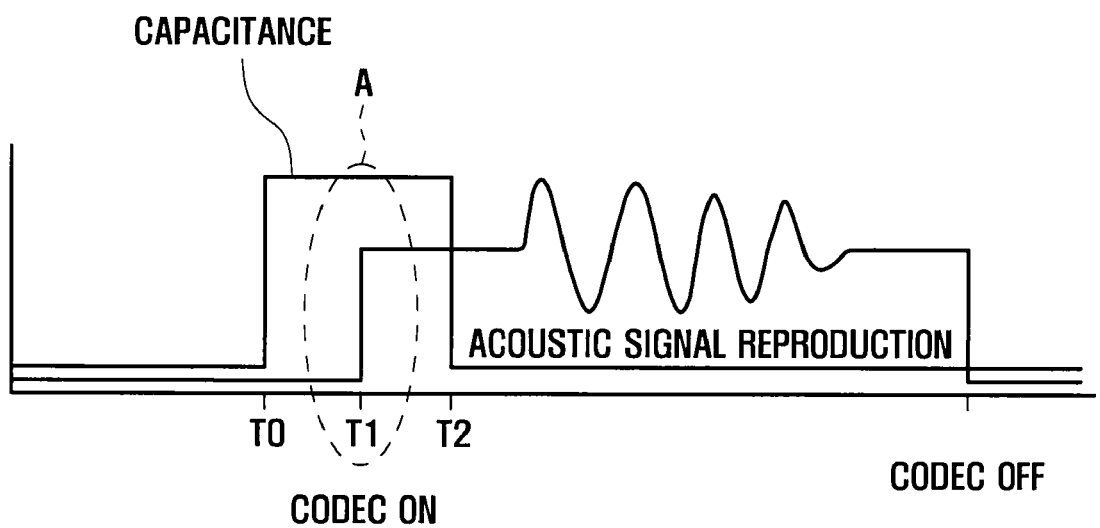
FIG. 5B illustrates changes in capacitance to suppress a popup noise.

FIG. 5A illustrates the generation of a popup noise during output of an acoustic signal generated in a mobile phone, and FIG. 5B illustrates changes in capacitance to suppress a popup noise. As shown in FIG. 5A, a popup noise "A" is generated upon turning on the codec 307 at a time "t1". To remove the popup noise A, as shown in FIG. 5B, the capacitance of the low-pass filter 310 is increased by turning on the switch 314 at a time "t0" immediately before turning on the codec 307; and the capacitance of the low-pass filter 310 is decreased by turning off the switch 314 at a time "t2" immediately before reproduction of an acoustic signal.

As apparent from the above description, the present invention provides a noise suppression circuit for a mobile phone wherein characteristics of a low-pass filter are adjusted according to usage conditions. Thereby white noise during an ongoing call can be effectively suppressed. Further, in generation of an internal acoustic signal such as key tones, the capacitance of the low-pass filter is increased immediately before activation of a codec, and is restored back to the previous capacitance immediately before reproduction of the acoustic signal, thereby removing a popup noise at the time of codec activation.

While preferred embodiments of the present invention have been shown and described in this specification, it will be understood by those skilled in the art that various changes or modifications of the embodiments are possible without departing from the spirit and scope of the invention as defined by the appended claims.

What is claimed is:

1. A noise suppression circuit for a mobile phone comprising:
   a coder/decoder (codec) for decoding a received audio signal;
   a speaker for reproducing the audio signal; and
   a low-pass filter having a variable capacitor, for reducing noise in the audio signal by adjusting the variable capacitor according to volume of the audio signal,
   wherein when the audio signal is an internally generated acoustic signal, the capacitance of a varactor of the low-pass filter is increased immediately before turning on the codec and is decreased immediately before reproduction of the audio signal.

2. The noise suppression circuit of claim 1, wherein the audio signal is a signal received by an antenna.

3. The noise suppression circuit of claim 1, wherein the audio signal indicates operation states of the mobile phone.

4. The noise suppression circuit of claim 1, wherein the low-pass filter comprises:
   a resistor;
   the varactor connected to ground; and
   a capacitor connected to ground, wherein the varactor is connected in parallel to the capacitor and one end of the resistor.

5. The noise suppression circuit of claim 4, wherein the capacitance of the varactor is increased when a voice signal is not present in the audio signal.

6. The noise suppression circuit of claim 1, wherein the low-pass filter comprises:
   a resistor;
   a first capacitor connected to ground; and
   a second capacitor connected to ground via a switch, wherein the first capacitor is connected in parallel to the second capacitor.

7. The noise suppression circuit of claim 6, wherein the switch is open when a voice signal is present in the audio signal, and the switch is closed when the voice signal is not present in the audio signal.

8. The noise suppression circuit of claim 6, wherein when the audio signal is the internally generated acoustic signal, the switch is closed immediately before turning on the codec and is opened immediately before reproduction of the audio signal.

9. The noise suppression circuit of claim 4, wherein one end of the resistor is connected to the varactor and the capacitor.

10. The noise suppression circuit of claim 9, wherein the one end of the resistor is not connected to ground.

11. A method of suppressing noise in a mobile phone, the method comprising:

decoding a received audio signal;

low pass filtering the signal according to volume of the signal, wherein a low pass filter for filtering the signal includes a varactor;

increasing a capacitance of the varactor when a voice signal is not present in the audio signal; and decreasing the capacitance of the varactor when the voice signal is present, wherein when the audio signal is an internally generated acoustic signal, the capacitance of the varactor is increased immediately before turning on a coder/decoder (codec) for decoding a received audio signal, and the capacitance of the varactor is decreased immediately before reproduction of the audio signal.

* * * * *